United States Patent
Gille et al.

(10) Patent No.: US 6,935,640 B2
(45) Date of Patent: Aug. 30, 2005

(54) SNOW SCOOTER WITH REAR MOUNTED FOOT ACTUATED BRAKE

(75) Inventors: Robert Louis Gille, Brightwood, OR (US); James R. Abney, Portland, OR (US)

(73) Assignee: Ski Skoot, Inc., Sammamish, WA (US)

(*) Notice: Subject to any disclaimer, the term of this patent is extended or adjusted under 35 U.S.C. 154(b) by 0 days.

(21) Appl. No.: 10/452,682

(22) Filed: May 30, 2003

(65) Prior Publication Data

US 2003/0193170 A1 Oct. 16, 2003

Related U.S. Application Data

(63) Continuation of application No. 09/970,381, filed on Oct. 2, 2001, now abandoned.
(60) Provisional application No. 60/237,225, filed on Oct. 2, 2000.

(51) Int. Cl.[7] .................................................. B62B 9/04
(52) U.S. Cl. ..................... 280/14.28; 280/16; 280/14.27
(58) Field of Search ................................ 280/14.28, 20, 280/7.12, 16, 14.25, 22, 28, 87.041, 87.042, 205, 14.1, 14.21, 14.22, 14.27, 609

(56) References Cited

U.S. PATENT DOCUMENTS

| 1,294,375 | A | * | 2/1919 | Austin ........................... 280/22 |
| 1,524,850 | A | * | 2/1925 | Van Daam ................. 280/14.28 |
| 1,681,297 | A | * | 8/1928 | Lindroos ....................... 280/22 |
| 1,968,975 | A | | 6/1934 | Upsacker et al. |
| 2,101,229 | A | * | 12/1937 | Anderson et al. ......... 280/14.28 |
| 2,359,076 | A | * | 9/1944 | Asbury ........................... 280/16 |
| 3,870,330 | A | * | 3/1975 | Hatano et al. ................. 280/16 |
| 4,037,852 | A | * | 7/1977 | Bayer et al. ............. 280/87.042 |
| 4,167,225 | A | * | 9/1979 | Fragoso ........................... 188/5 |
| 5,470,089 | A | * | 11/1995 | Whitson et al. ......... 280/87.041 |
| 5,516,126 | A | * | 5/1996 | Myers ....................... 280/14.28 |
| 6,139,031 | A | * | 10/2000 | Wingard .................... 280/14.28 |
| 6,652,422 | B1 | * | 11/2003 | Day ............................... 482/51 |
| 2002/0109314 | A1 | * | 8/2002 | Chen ........................ 280/14.28 |
| 2002/0180168 | A1 | * | 12/2002 | Rizk ....................... 280/87.041 |
| 2003/0067127 | A1 | * | 4/2003 | McClure et al. .......... 280/14.28 |
| 2003/0141682 | A1 | * | 7/2003 | Comden ................... 280/14.28 |
| 2004/0007838 | A1 | * | 1/2004 | Farmer ...................... 280/14.27 |
| 2004/0017052 | A1 | * | 1/2004 | Takahashi ................. 280/14.28 |

FOREIGN PATENT DOCUMENTS

CH  616854 A5 *  4/1980  ........... A63C/17/14

* cited by examiner

Primary Examiner—J. Allen Shriver
(74) Attorney, Agent, or Firm—Graybal Jackson Haley LLP

(57) ABSTRACT

A improvement to a snow scooter having a longitudinal axis, a stand-on area, a back portion rearward of the stand-on area, a handle, and at least one gliding surface having a flat portion defining a plane. The improvement includes a brake plate, operable with a foot of a rider, mounted at an aft end of the scooter. The brake plate is oriented transverse to the longitudinal axis, and is affixed to the scooter with a pivot transverse to the longitudinal axis in the back portion rearward of the stand-on area. Further, the brake plate is retained above the plane of the flat portion of the gliding surface by a spring until depressed with a force that overcomes the spring allowing the brake plate to pivot downwardly to protrude below the plane of the flat portion of the gliding surface.

21 Claims, 2 Drawing Sheets

SNOW SCOOTER WITH REAR MOUNTED FOOT ACTUATED BRAKE

This is a continuation of the prior application Ser. No. 09/970,381, filed Oct. 2, 2001 now abandoned, the benefit of the filing date of which is hereby claimed under 35 USC 120.

This application claims the benefit of provisional application No. 60/237,225, filed Oct. 2, 2000.

FIELD OF THE INVENTION

The invention relates to apparatus and methods for conveying a user over snow, sand, or similar media, and particularly to a snowskate and/or snow scooter apparatus for conveying a user over snow without special boots, bindings, or sticks.

BACKGROUND OF THE INVENTION

There are various apparatus for conveying a user over snow, including skis and snowboards, among others. Snowboards are particularly simple in that they typically include a single board having a stand-on plate that supports two parallel side-by-side bindings for fixing the feet of a rider. Snowboarding involves using these bindings and the edges of the snowboard to control the direction and stability of the rider, because the snowboards themselves do not have inherent directional stability. Unfortunately, snowboarding requires significant skill and practice, putting snowboarding beyond the reach of casual users. Moreover, snowboards typically are expensive, creating an additional impediment to their use.

SUMMARY OF THE INVENTION

The invention provides apparatus and methods for conveying a user over snow, sand, or similar media. The apparatus may include mechanisms for providing directional stability, making it easier to use than skis and snowboards. Moreover, the apparatus may be less expensive than skis and snowboards.

DETAILED DESCRIPTION OF THE INVENTION

Figure 1:
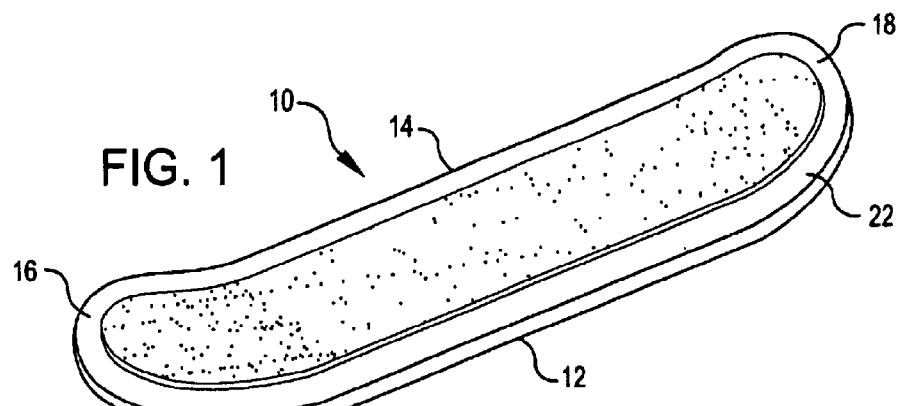
FIG. 1 shows a perspective view of a snowskate constructed in accordance with aspects of the invention.
Figure 2:
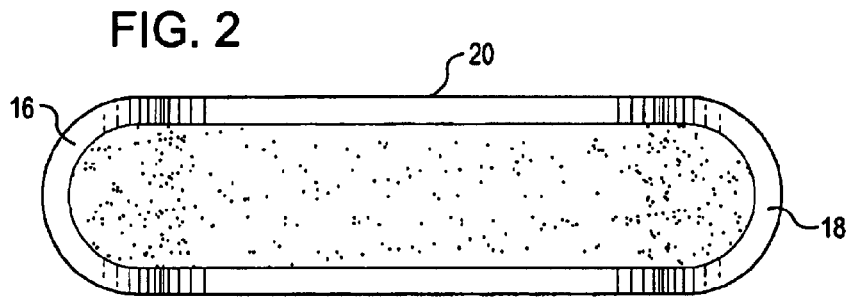
FIG. 2 shows a top view of the snowskate of FIG. 1.
Figure 3:
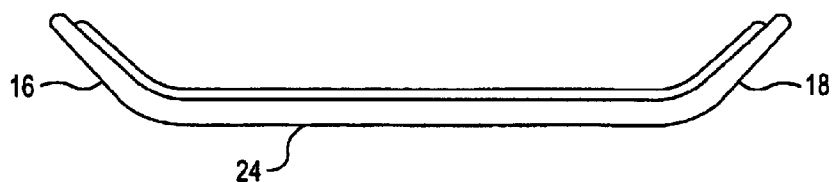
FIG. 3 shows a side view of the snowskate of FIG. 1.
Figure 4:
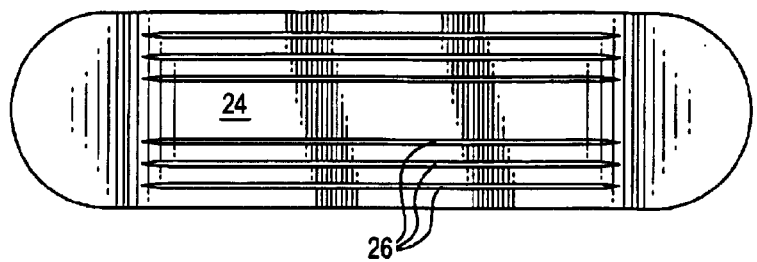
FIG. 4 shows a bottom view of the snowskate of FIG. 1.
Figure 5:
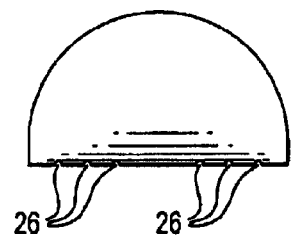
FIG. 5 shows an end view of the snowskate of FIG. 1.

The invention provides apparatus and methods for conveying a user over snow, sand, or similar media. The apparatus, which may be termed a "snowskate" or "snow scooter," generally includes a glide plate having an upper surface for supporting a user and a lower surface for slidingly and controllably engaging snow. The apparatus also may include wheels, a handle, and/or a brake, among others. The apparatus may be used by standing atop the upper surface and sliding on or through the snow or similar media under the influence of gravity, a starting momentum or both.

FIGS. 1–5 show a snowskate 10 constructed in accordance with aspects of the invention. Snowskate 10 includes an elongated glide plate 12 having a central portion 14 configured to support a user on snow and to slide over the snow. The glide plate also has a front portion 16 and a back portion 18 extending outward from the central portion that may be configured to perform various functions.

The central portion preferably is planar, or substantially planar, with approximately uniform width and thickness. However, the central portion may decrease in thickness toward its perimeter 20, and decrease in width toward the front 16 and back 18 portions. Moreover, in some embodiments, the central portion may be arched slightly before loading (e.g., in the longitudinal direction), so that the central portion flattens upon loading to produce a more resilient, uniform contact pressure with the snow. In addition, the perimeter of the central portion may be rounded to reduce or eliminate sharp edges, and/or curved to accommodate different types of snow (e.g., wet, powder, etc.) and terrain (e.g., flat or inclined, rural or urban, etc.).

The front and back portions generally are joined continuously to the central portion and preferably are shaped and dimensioned to enhance the safety, functionality, and appearance of the snowskate. For example, the front and/or back portions may be rounded rather than square or pointed to reduce their likelihood of inflicting injury. Moreover, the front and/or back portions may curve upward out of the plane of the central portion. A curved front portion may facilitate sliding over snow and obstacles, while a curved back portion may be used in braking, as described below. If both the front and back portions are similarly curved, the snowskate may be used bi-directionally. The bending of the front and back portions may proceed as a uniformly upwardly-arched curvature.

Glide plate 12 has an upper surface 22 and a lower surface 24 that may be shared among the front, central, and back portions described above. The upper surface may be configured to support and stabilize a user's feet. For example, the upper surface may be textured to reduce slippage by using bumps, grooves, ridges, and the like. Alternatively, or in addition, the upper surface may be finished to reduce slippage by using a relatively non-slip and/or anti-skid surface material, such as cushioned foam or another soft material. The features for reducing slippage may extend over most or all of the upper surface, or they may be confined to a stand-on region configured to receive the user's feet. The upper surface preferably is configured so that a user can alight atop the snowskate without a significant likelihood of slipping.

The lower surface may be configured slidingly and controllably to engage snow, sand, or similar media. To promote sliding, portions of the lower surface may be substantially smooth, without significant protrusions or indentations. To promote control, portions of the lower surface also may include control features, such as grooves or ridges. In the preferred embodiment, the lower surface is substantially smooth, except for a plurality of grooves 26 that extend substantially parallel to the sides of the glide plate to facilitate directional stability and steering. The depth, width, length, and number of these grooves (or other control features) can be selected according to the anticipated snow and terrain. Here, the snowskate includes six grooves, three on each side of the longitudinal centerline. These grooves are approximately 1/8 to 1/2 inch deep, and they run the length of the lower surface of the snowskate between the beginnings of the upward slopes of the front and back portions.

In summary, the preferred embodiment includes an elongated glide plate having (1) a longitudinal axis, (2) an upper surface for receiving the feet of a user, (3) a central portion having a substantially constant width, (4) a front portion bent upwardly, (5) a back portion bent upwardly, and (6) a lower surface having a series of substantially constant-width longitudinal grooves.

The glide plate may be formed of any material or materials capable of supporting a user and sliding over snow. A preferred material is a rugged plastic, such as polyethylene or P-Tex. Suitable dimensions (width, thickness, and length) of the snowskate range between those of a skateboard and those of a snowboard. Preferred dimensions are about 7 inches wide, 1 inch thick, and 30 inches long.

A user may "ride" the snowskate (or snow scooter) by placing the lower surface of the snowskate in contact with snow (or a similar medium), standing on the upper surface of the snowskate, and moving together with the snowskate under the influence of gravity, momentum, or both. The user preferably stands freely and upright on the upper surface, with his (or her) feet in a somewhat straddling position and his (or her) hands and upper body free. The user may move along straight or curved lines in the snow, without sticks or other aids, and with little learning, simply by shifting body weight to engage or disengage the grooves or other control features on the lower surface of the snowskate. For example, the grooves may be engaged to initiate running in a curve by shifting body weight toward the back and side of the center point of the glide plate. Similarly, the snowskate may be braked and brought to a stop by shifting body weight toward the back of the center point of the glide plate, such as on the back portion of the glide plate. In the preferred embodiment, a user may conveniently distinguish the upper and lower surfaces of the snowskate by the different appearances of the surfaces and by upward curvature of the front and back portions.

The invention provides several potential advantages over skis and snowboards. First, the snowskate does not require expensive equipment, such as ski boots, bindings, sticks, and the like. Second, the snowskate may be economically manufactured and purchased. Third, the snowskate may be light, compact, and convenient to transport.

Figure 6:
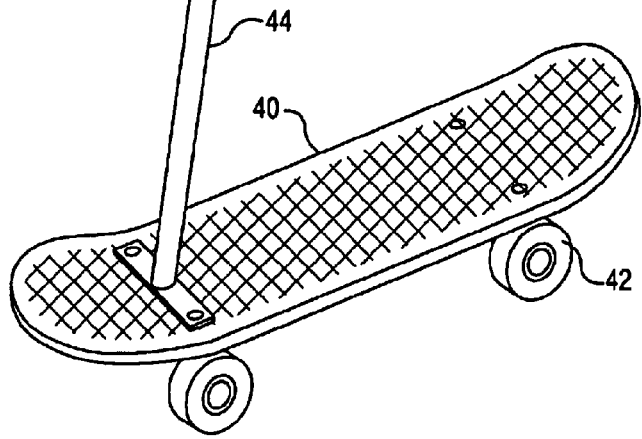
FIG. 6 shows a perspective view of a snow scooter constructed in accordance with aspects of the invention, showing how wheels and/or a handle may be fitted to the snowskate.
Figure 7:
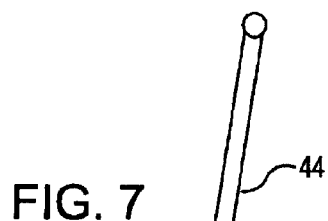
FIG. 7 shows a side view of the snow scooter of FIG. 6, showing a braking device.

FIGS. 6–7 shows three of many ways in which a snowskate can be modified for use under different conditions or on different surfaces. For example, the snowskate 40 may be fitted with removable wheels 42 (or wheel assemblies) for use on solid surfaces, such as concrete or pavement. These wheels can be attached to the lower surface of the glide plate using any suitable mechanism, including bolts or quick release mechanisms. The snowskate also may be fitted with a removable or permanent handle 44 for use as a "snow scooter" without the wheels or as a regular scooter with the wheels. The handle also may provide an additional mechanism for stabilizing the snowskate, making it easier to use. The snowskate also may be fitted with a brake mechanism to assist in the control of speed, for example, by fitting a pivotable brake plate 46 to the back portion of the snowskate. The mechanisms for attaching the wheels, handle, and/or brake preferably have low profiles so that they do not interfere with sliding motion of the snowskate on snow, particularly when the wheels, handle, and/or brake are removed.

The invention can be commercially exploited by industrial production, by the sale or use of the objects so produced, and/or by permitting third parties to perform the activities mentioned against a fee, among others. Although the invention is disclosed in its preferred forms, the specific embodiments disclosed and illustrated herein should not be considered in a limiting sense, because numerous variations are possible. Applicants regard the subject matter of their invention to include all novel and non-obvious combinations and subcombinations of the various elements, features, functions, and/or properties disclosed herein. No single feature, function, element, or property of the disclosed embodiments is essential.

What is claimed is:

1. An approved snow scooter having a general symmetry about a longitudinal plane, a stand-on area, a back portion rearward of the stand-on area, a handle, and at least one gliding surface having a flat portion defining a gliding plane, the improvement comprising:

a brake plate having two major dimensions and a minor dimension, the two major dimensions defining a face oriented generally transverse to the longitudinal plane, the brake plate trailingly and pivotably affixed to the scooter in the back portion with a pivot transverse to the longitudinal plane, the brake plate coupled to an actuation surface operable with a foot of a rider via a coupling structure that extends from the actuation surface disposed above the gliding surface, through a cut-out in the gliding surface, to the brake plate, the actuation surface being at the back portion of the scooter, the brake plate being retained above the gliding plane of the flat portion of the gliding surface by a spring until depressed with a force that overcomes the spring allowing the brake plate to pivot downwardly to protrude below the gliding plane of the flat portion of the gliding surface.

2. The improved snow scooter of claim 1 where the gliding surface is a lower surface of a glide plate and the stand-on area is an upper surface of the glide plate.

3. The improved snow scooter of claim 2 where the glide plate has an upturned back portion and the brake plate protrudes below the upturned back portion when depressed.

4. The improved snow scooter of claim 1 where the gliding surface has a series of substantially constant width longitudinal grooves.

5. The improved snow scooter of claim 1 where the stand-on area is finished with an anti-skid surface material.

6. The improved snow scooter of claim 3 where the pivot further includes being affixed to the upturned back portion.

7. The improved snow scooter of claim 1, wherein the snow scooter when viewed perpendicular to the gliding plane further includes an outer periphery circumscribing the scooter, and wherein the brake plate when protruding below the gliding plane lies within the outer periphery.

8. The device of claim 1, wherein the coupling structure is a part of the actuation surface.

9. The device of claim 1, wherein the coupling structure is a part of the brake plate.

10. A device that conveys a user in a substantially upright position across snow, the device comprising:

an elongated glide plate having a general symmetry about a longitudinal plate, and a front portion and a back portion joined together by a central portion;

a pivot that couples a pivotably activated brake and a portion of the glide plate rearward of a midpoint of the device, and the pivotably activated brake including:
      a. a coupling portion coupled with the pivot;
      b. a braking plate having a face oriented generally transverse to the longitudinal plate, and configured to trailingly engage the snow; and c. a user engagement portion that receives a force applied by at least a portion of a foot of a user and transfers the force to the braking plate via a force transmission structure that passes through a cut-out in the elongated glide plate, pivoting the braking plate about the coupling portion to trailingly engage the snow and brake the device.

11. The device of claim 10, wherein the elongated glide plate is flexible over at least the central portion.

12. The device of claim 10, further comprising a spring disposed between the glide plate and the brake, the spring biasing the braking plate in an elevated position and away from the snow when the glide plate is proximate to the snow until depressed with a force that overcomes the spring allowing the braking plate to pivot downwardly and protrude into the snow.

13. The device of claim 10, further including a handle coupled with a portion of the glide plate forward of a midpoint of the device.

14. The device of claim 13, wherein the handle is removably coupled.

15. The improved snow scooter of claim 10, wherein the snow scooter when viewed perpendicular to the gliding plane further includes an outer periphery circumscribing the scooter, and wherein the brake plate when retained lies within the outer periphery.

16. The device of claim 10, wherein the force transmission structure is a part of the braking plate.

17. The device of claim 10, wherein the force transmission structure is a part of the user engagement surface.

18. An improved snow scooter having a general symmetry about a longitudinal plane, a stand-on area, a back portion rearward of the stand-on area, a handle, and a at least one gliding surface having a flat portion defining a gliding plane, the improvement comprising:

a pivot coupled to the back portion;

a brake plate having a face oriented generally transverse to the longitudinal plane, trailingly and pivotably coupled to the pivot, and operable with a foot of a rider; and a spring that retains the brake plate about the gliding plane of the flat portion of the gliding surface until depressed with a force that overcomes the spring allowing the brake plate to pivot and protrude below the gliding plane, the force being transmitted via a force transmission structure that passes through a cut-out in the gliding plane.

19. The improved snow scooter of claim 18, wherein the snow scooter when viewed perpendicular to the gliding plane further includes an outer periphery circumscribing the scooter, and wherein the brake plate when retained lies within the outer periphery.

20. The device of claim 18, wherein the force transmission structure is a part of the brake plate.

21. The device of claim 18, wherein the force transmission structure is a part of a user engagement surface.

* * * * *